Nov. 24, 1942.     J. DUSEVOIR     2,303,031
COUPLING
Filed July 31, 1941

INVENTOR
Julius Dusevoir.
BY
Harness, Dickey & Pierce.
ATTORNEYS.

Patented Nov. 24, 1942

2,303,031

UNITED STATES PATENT OFFICE 2,303,031

COUPLING

Julius Dusevoir, Dearborn, Mich., assignor to Century Motors Corporation, Dearborn, Mich., a corporation of Michigan Application July 31, 1941, Serial No. 404,754

4 Claims. (Cl. 287—113)

This invention relates to separable couplings for rotating elements and has for its principal object the provision of such a coupling that is capable of transmitting a maximum amount of torque in a coupling of minimum diameter.

Objects of the invention include the provision of a coupling for joining a pair of rotating elements that eliminates the use of bolts or other connecting means subjected to shearing stresses; the provision of a coupling for joining a pair of rotatable elements together that utilizes substantially the entire opposing end faces of the elements to transmit the torque load between them; the provision of a coupling for joining a pair of rotatable elements that automatically maintains its alignment; the provision of a coupling for use between a pair of rotatable elements that embodies the maximum amount of strength in a minimum diameter; the provision of a two-part coupling the meeting faces of which are provided with complementary serrations thereon which are of an irregular shape such that the two parts of the coupling may be brought into concentric relation only at one position of registration of the serrations, the complementary serrations cooperating to resist circumferential disassociation arising from torque, radial or other similar forces; and the provision of a joint of the type described in which the serrations are either of a sinusoidal or herringbone form.

The above being among the objects of the present invention the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a side elevational view of a pair of aligned shafts secured together by a coupling member constructed in accordance with the present invention;

Figure 1:
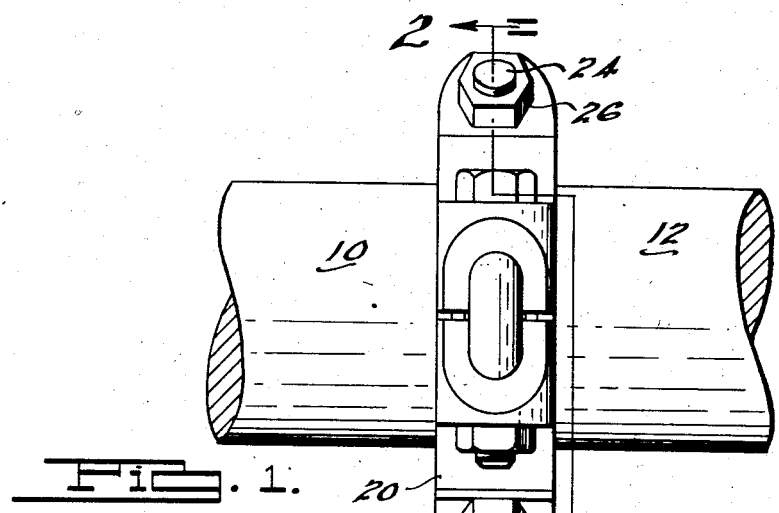

The coupling of the present invention may be employed to drivingly connect any rotatable pair of elements having a common axis of rotation and by its use substantially the entire area of the cooperating end faces of the two elements is employed for resisting relative rotation between the elements and, where properly constructed as to the angularity of the side faces of the serrations, eliminates the need of placing connecting devices such as bolts or the like under shearing stresses. In this respect the invention is similar to the coupling disclosed in my United States Letters Patent No. 2,013,039, issued Sept. 3, 1935, on Crankshaft, the difference of the present invention as compared to the coupling shown in my above identified patent being that in the present case the cooperating serrations are so constructed and arranged that when arranged in proper complemental relation they positively prohibit, in and of themselves, radial displacement of one element with respect to the other in any direction, as well as to prohibit relative rotation between the two elements. This difference in effect is obtained in the present invention by making the serrations of irregular or changing conformation. In other words, in my prior patent above identified the cooperating serrations between associated parts were arranged as curves all struck from the same center. The serrations in accordance with the present invention may be made with either straight or curved portions but where straight different portions of each serration extend at an angle to other portions of the same serration and when curved may be curved either uniformly or non-uniformly in more than one direction. It will be understood that in the following description and claims the term "irregular serrations" is to be interpreted in accordance with the above described explanation of the term.

For the purpose of illustration in the accompanying drawing I have shown one construction in which the serrations are sinusoidal in character, that is they are uniformly curved first in one direction and then in the opposite direction and although in one sense it may be considered as being regularly curved first in one direction and then in the opposite direction, from the standpoint of the present invention they are deemed to be irregularly curved in that different portions of each serration are struck from different centers. The drawing also shows a modified form of construction in which the serrations are each formed from portions each straight in character but the portions are directed first in one direction and then the other to form a herringbone-like construction. Here again the serrations may be considered to be regular in the sense that they extend first in one direction and then the other but from the standpoint of the present invention are irregular in that different portions extend at different angles to each other.

In accordance with the present invention the two elements of the coupling may be secured together against axial separation in any suitable or approved manner. For instance where one of the elements is short enough one or more bolts, studs or the like may be extended axially through one or the other or both simply to prevent axial separation of the two elements, the securing means in such case being entirely free of shearing stresses during the transmission of torque or bending loads between the two elements because of the intermatching or complemental serrations provided for taking such torque, radial load, or the like. On the other hand the adjacent ends of the cooperating elements may be provided with flanges suitably secured against axial separation in any approved manner. The particular type of means illustrated in the drawing for holding the two ends of the elements against axial separation includes relatively narrow flanges and an encircling clamping device which is preferable under some circumstances particularly where it is desired to maintain the maximum diameter of the elements themselves as small as possible.

Figure 2:
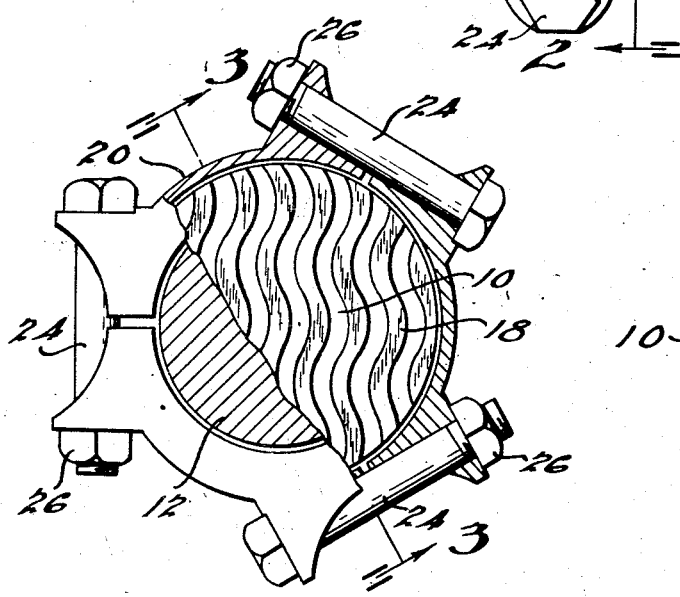
Fig. 2 is a transverse sectional view taken on the line 2—2 of Fig. 1 and showing one of the shafts in end view.
Figure 3:
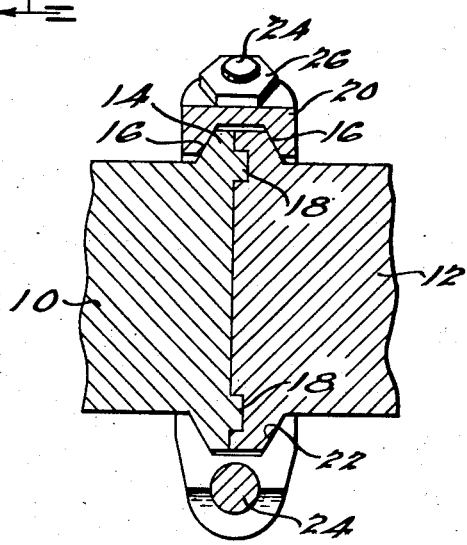
Fig. 3 is a longitudinal sectional view taken on the line 3—3 of Fig. 2.

Referring now to the accompanying drawing the two elements there shown connected together are, for the purpose of illustration, shown as shafts 10 and 12, having cooperating abutting faces arranged generally in a plane perpendicular to the axes of the shafts. Each shaft 10 and 12 is formed to provide a relatively shallow radially directed annular flange 14 at that end thereof cooperating with the opposed end of the other of said shafts and such flanges are provided with beveled axially directed faces 16 as indicated best in Fig. 3. In accordance with the present invention the opposing faces of the abutting ends of the shafts 10 and 12, as well as the flanges 14, are provided with inter-engaging and complemental sinusoidal serrations 18 as best illustrated in Fig. 2, the serrations 18 of the shaft 10 interfitting with the serrations 18 of the shaft 12 and preferably only when the shafts 10 and 12 are concentric with one another and preferably only at one position of rotation thereof. The size of the serrations 18 may, of course, vary to a greater or lesser extent but preferably are sufficiently numerous as to provide a multiplicity of cooperating serrations extending over substantially the entire area of abutting faces of the shafts 10 and 12 to resist displacement of one shaft with respect to the other while transmitting torque, radial load, or the like. In other words, the entire cross-sectional area of the serrations combine to resist not only relative turning of the shafts as in my prior patent, but also to resist lateral movement of one of the shafts with respect to the other in any direction. The depth of the serrations is not of extreme importance as long as ample surface area is provided laterally between them to transmit the desired forces without danger of disengagement in service.

Where the sides of the serrations are perpendicular to the plane of the end face of the shaft on which they are formed, or are disposed thereon at an angle less than the angle of friction of the metal from which the shafts are formed, then in the absence of any end thrust on either of the shafts tending to separate the shafts axially, all that is required to maintain the proper functioning of the coupling between the two shafts is the provision of some means to prevent inadvertent axial dis-association thereof. Where the angularity of the sides of the serrations exceed the angle of friction of the metal from which they are formed, then some additional means must be provided for coupling the two shafts together against axial separation only. While any means may suffice for this purpose, where the particular type of flange 14 is employed as shown, then a preferred type of coupling device consists of a three-part clamp indicated generally at 20 the individual parts of which are grooved as at 22 in complementary relationship with respect to the beveled sides 16 of the two flanges 14 and internally receive such beveled sides therein, the adjacent parts of the device being clamped together by means of tangentially directed bolts 24 and cooperating nuts 26 as indicated.

Figure 4:
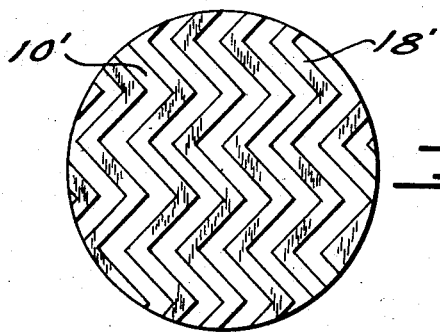
Fig. 4 is an end view of a shaft having a modified form of serrations formed thereon.

In Fig. 4 a shaft 10' is illustrated in end view showing such end with a modified form of serrations 18' formed thereon. The serrations in this case are each formed of alternately oppositely directed straight portions so that the various serrations cooperate to form a more or less herringbone structure. This type of serration, similar to the serrations 18 in Fig. 2, permits joining of the ends of two shafts or other elements preferably in one position of rotation only when the elements are concentric and, like the construction illustrated in the previous views, while the serrations are arranged in intermatching or complemental relationship lateral movement of one of the elements with respect to the other in any direction is positively prohibited.

It will be appreciated that in both types of construction shown substantially the entire areas of the matching faces of the two elements resist relative rotation and lateral displacement of the two ends. At the same time the two elements being preferably concentrically joinable in one position of relative rotation only their concentricity is assured at all times.

Having thus described my invention, what I claim by Letters Patent is:

1. In a coupling for a pair of members having abutting surfaces adapted to be joined together and secured against displacement in all directions, means for positively preventing displacement between said abutting surfaces, said means comprising a multiplicity of interlocking serrations formed in the abutting surfaces of said members and being of such configuration that portions of each of said serrations are directed alternately in opposite directions so that at least portions thereof would cross any straight line lying in the plane of said surfaces and passing through the center thereof, whereby radial slippage and axial turning is prevented in all directions.

2. In a coupling for a pair of members having abutting surfaces adapted to be joined together and secured against displacement in all directions, means for positively preventing displacement between said abutting surfaces, said means comprising a multiplicity of interlocking serrations formed in the abutting surfaces of said members and being of uniform cross section from end to end and of such configuration that portions of each of said serrations are directed alternately in opposite directions so that at least portions thereof would cross any straight line lying in the plane of said surfaces and passing through the center thereof, whereby radial slippage and axial turning is prevented in all directions.

3. In a coupling for a pair of members having abutting surfaces adapted to be joined together and secured against displacement in all directions, means for positively preventing displacement between said abutting surfaces, said means comprising a multiplicity of interlocking serrations formed in the abutting surfaces of said members, said serrations being of uniform cross section from end to end and being sinusoidal in configuration so that at least portions thereof would cross any straight line lying in the plane of said surfaces and passing through the center thereof, whereby radial slippage and axial turning is prevented in all directions.

4. In a coupling for a pair of members having abutting surfaces adapted to be joined together and secured against displacement in all directions, means for positively preventing displacement between said abutting surfaces, said means comprising a multiplicity of interlocking serrations formed in the abutting surfaces of said members, said serrations being of uniform cross section from end to end and said serrations being of herring-bone configuration so that at least portions thereof would cross any straight line lying in the plane of said surfaces and passing through the center thereof, whereby radial slippage and axial turning is prevented in all directions.

JULIUS DUSEVOIR.